United States Patent
Duck et al.

[19]

[11] Patent Number: 6,014,484
[45] Date of Patent: Jan. 11, 2000

[54] METHOD AND DEVICE FOR OPTICAL COUPLING

[76] Inventors: Gary S. Duck, 6 Barcham Crescent, Nepean, Ontario, Canada, K2J 3Z7; Yihao Cheng, 36 Meadowbreeze Drive, Kanata, Ontario, Canada, K2M 2L6; Calvin Si, 13 Mullcraft Cres., Nepean. Ontario, Canada, K2J 4P8

[21] Appl. No.: 09/015,325

[22] Filed: Jan. 29, 1998

Related U.S. Application Data

[63] Continuation-in-part of application No. 08/942,496, Oct. 2, 1997.

[51] Int. Cl.[7] ............................................. G02B 6/32
[52] U.S. Cl. ................................................. 385/34
[58] Field of Search ................... 385/34, 61, 79

[56] References Cited

U.S. PATENT DOCUMENTS

| | | | |
|---|---|---|---|
| 4,522,461 | 6/1985 | Mannschke | 385/34 |
| 5,138,677 | 8/1992 | O'Shaughnessy et al. | 385/34 |
| 5,459,605 | 10/1995 | Kempf | 385/34 |
| 5,499,132 | 3/1996 | Tojo et al. | 385/34 |
| 5,539,577 | 7/1996 | Si et al. | 385/34 |
| 5,594,821 | 1/1997 | Cheng | 385/34 |
| 5,652,814 | 7/1997 | Pan et al. | 385/34 |
| 5,689,360 | 11/1997 | Kurata et al. | 385/34 |
| 5,751,870 | 5/1998 | Forkner et al. | 385/34 |
| 5,761,357 | 6/1998 | Peck | 385/34 |
| 5,796,889 | 8/1998 | Xu et al. | 385/34 |
| 5,805,748 | 9/1998 | Izawa | 385/34 |

*Primary Examiner*—Rodney Bovernick
*Assistant Examiner*—Robert E. Wise
*Attorney, Agent, or Firm*—Neil Teitelbaum & Associates

[57] ABSTRACT

A method and circuit is provided for more efficiently coupling light between two optical waveguides such as optical fibres. When the two waveguides are coupled to spaced apart collimating lenses such as GRIN lenses, the beam propagating between the spaced part lenses may be shifted. In this instance light can more efficiently be coupled out of the output optical fibre if it is angled with respect to the optical axis of the GRIN lens to which it is coupled. This invention provides an output fibre that is non-parallel with the optical axis of the lens it is coupled thereto.

14 Claims, 2 Drawing Sheets

METHOD AND DEVICE FOR OPTICAL COUPLING

This application is a continuation-in-part application U.S. patent application Ser. No. 08/942,496, filed Oct. 2, 1997.

FIELD OF THE INVENTION

This invention relates to the coupling of light from one optical fibre to at least another optical fibre wherein the light is coupled through a pair of spaced collimating lenses.

BACKGROUND OF THE INVENTION

It is well known to couple light from one optical fibre to another through a pair of collimating lenses, for example graded index (GRIN) lenses. Lenses of this type are produced under the trade name "SELFOC"; the mark is registered in Japan and owned by the Nippon Sheet and Glass Co. Ltd. However, it is less well known, that substantial coupling losses may occur between an input port on a first GRIN lens, or other type of collimating lens and an output port an a second GRIN or other type of collimating lens, when the input and output ports are disposed adjacent the optical axes of the two collimating lenses, and when the distance or gap between the lenses is significant.

Although the detailed description hereafter concerns GRIN lenses, this invention is also relevant to the use of other types of collimating lenses and should not be limited to graded index lenses.

Substantial coupling losses may occur between an input port on a first GRIN lens and an output port and a second GRIN lens, when the input and output ports are disposed adjacent the optical axes of the two GRIN lenses, and wherein an optical element is disposed between the GRIN lenses wherein the element causes a beam propagating from the input port through the first GRIN lens to be shifted as it traverses the element towards the output port and enters the second lens at an offset to the optical axis of the lens.

As requirements for optical filters become more stringent, in some instances their thicknesses increase substantially. This increase in thickness increases the required gap between a pair of collimating lenses.

Typically, dichroic optical filter based devices are manufactured by disposing one or more filter layers between a pair of substantially quarter pitch GRIN lenses.

It is an object of this invention to overcome this disadvantage wherein a large gap is present between two collimating lenses, thereby causing a beam exiting a first collimating lens to enter a second collimating lens at a location shifted from its optical axis.

It is an object of this invention to overcome coupling losses normally associated with fibre to fibre GRIN lens systems wherein thick optical elements are disposed between a pair of GRIN lenses.

And, it is a further object of the invention to overcome coupling losses normally associated when an optical element disposed between a pair of GRIN causes a shift of a beam incident thereon.

SUMMARY OF THE INVENTION

In accordance with the invention, there is provided an optical coupling arrangement comprising:

a first GRIN lens, having an input port at an input end face, and a substantially collimating output end face;

a second GRIN lens, having a substantially collimating input end face and an output end face having an output port, wherein the output end face of the first GRIN lens is spaced from the input end face of the second GRIN lens;

a first longitudinal optical waveguide having a longitudinal optical axis optically coupled to the input port at the first end face; and, a second optical waveguide having a longitudinal optical axis optically coupled to the output port of the second GRIN lens, wherein the longitudinal optical axis of the second optical waveguide and the optical axis of the second GRIN lens are not parallel.

In accordance with the invention, there is provided an optical coupling arrangement comprising:

a first GRIN lens, having an input port at an input end face at a first end, and a output end face at another end;

a second GRIN lens, having an input end face at a first end and an output end face at another end having an output port, wherein the output end face of the first GRIN lens is spaced from the input end face of the second GRIN lens;

a first optical waveguide having a longitudinal optical axis, said waveguide being optically coupled to the input port at the input end face of the first GRIN lens; and, a second optical waveguide having a longitudinal optical axis, said second waveguide being optically coupled to the output port of the second GRIN lens, wherein a line extending the longitudinal optical axis of the second optical waveguide intersects a line extending the optical axis of the second GRIN lens at an angle other than zero degrees.

In accordance with yet another aspect of the invention a method is provided for coupling light between a first and a second optical fibre disposed adjacent a pair of spaced GRIN lenses. The method comprises the steps of optically coupling the first optical fibre to a port on a first of the pair of coaxial GRIN lenses; and, optically coupling a second optical fibre to a port on a second of the pair of GRIN lenses in such a manner as to ensure that optical axis of the optical fibre optically coupled to the second of the pair of GRIN lenses is non-parallel to the optical axis of the lens it is optically coupled thereto.

BRIEF DESCRIPTION OF THE DRAWINGS

Exemplary embodiments of the invention will now be described in conjunction with the drawings, in which:

FIG. 4 is a block diagram of an alternative embodiment of the coupling system in accordance with the invention wherein an input fibre is disposed along the optical axis of the GRIN lens it is optically coupled to.

DETAILED DESCRIPTION

Figure 1:
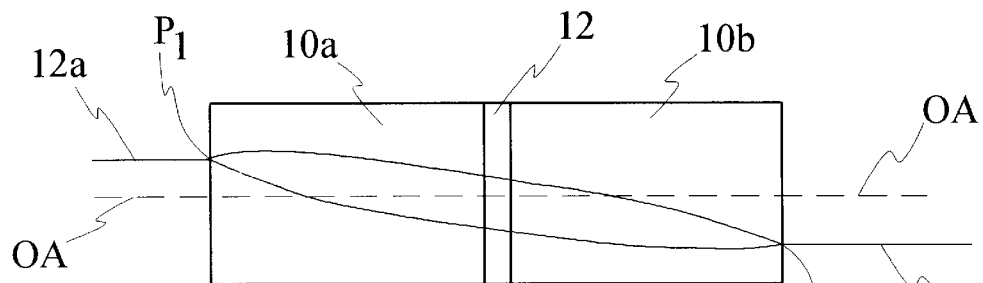
FIG. 1 is a conventional block diagram depicting a typical optical filter having a pair of GRIN lenses and a filtering element disposed therebetween.

Turning now to FIG. 1, a conventional optical filter arrangement is shown, wherein a thin dichroic multilayer optical filter 12 is disposed between a first quarter pitch collimating GRIN lens 10*a*, and a second quarter pitch GRIN lens 10*b*. The filter 12 can be coated directly on one of the inwardly facing end faces of the lenses, or alternatively may be coated on a substrate that is antireflection coated and sandwiched between the two GRIN lenses 10*a* and 10*b*. It should be noted, that the optical axes of the input/output fibres 10*a* and 10*b* are parallel with the optical axes of the two GRIN lenses. Since the beam traversing the lenses 10*a* and 10*b* about the filter element 12 is at a location substantially coincident with the optical axes of the GRIN lenses, the light input orthogonal to the end face of the lens 10*a* at port P1, propagates through the filter 12 and through the second lens 10*b* and exits as a focused beam that is parallel to the input beam and the optical axes of the lenses 10*a* and 10*b*.

Figure 2:
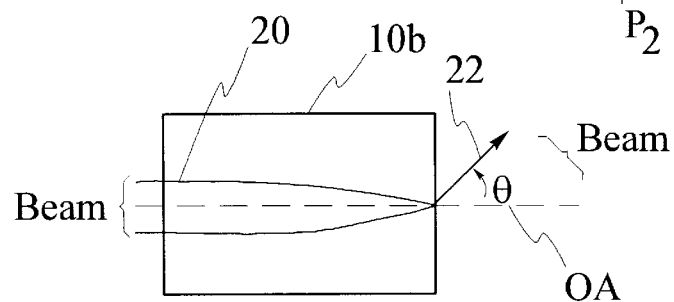
FIG. 2 is a block diagram showing a beam of light as it enters a substantially collimating GRIN lens at location offset from the optical axis of the lens.

Referring now to FIG. 2, an input beam 20 is shown entering an left end face of a GRIN lens 10*b* substantially offset from the optical axis OA of the lens. Due to this shift, or offset, the beam 22 at the output end of the lens exits at an angle θ and is non-parallel to the OA of the lens.

Figure 3:
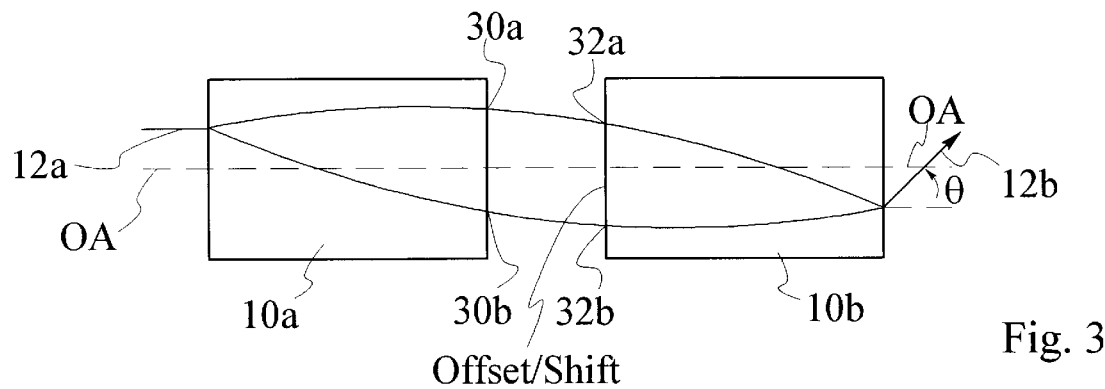
FIG. 3 is a block diagram of a coupling system in accordance with the invention, wherein losses are reduced by angling a receiving output fibre with respect to the angle of the input fibre.

FIG. 3 illustrates a shift or offset that occurs when a large gap is present between a pair of coaxial GRIN lenses 12*a* and 12*b*. The beam exiting the lens 12 intersects the end face equidistant from the optical axis indicated by 30*a* and 30*b* which define the outer most limits of the beam as it traverses the lens 12*a* end face. However, due to the large gap between the lenses 12*a* and 12*b*, the beam traverses the inwardly facing end face of the lens 12*b* having its outermost limits defined by the location 32*a* and 32*b* which are not equidistant from the optical axis OA of the second lens 12*b*. It is this beam shift downward that results in the output beam being directed upward along the optical axis of the optical fibre 12*b*. Hence, in accordance with this invention, the fibre 12*b* is provided at an angle θ>0 degrees with respect to the optical axis of the lens 12*b*. In this manner, more efficient optical coupling is provided.

Figure 4:
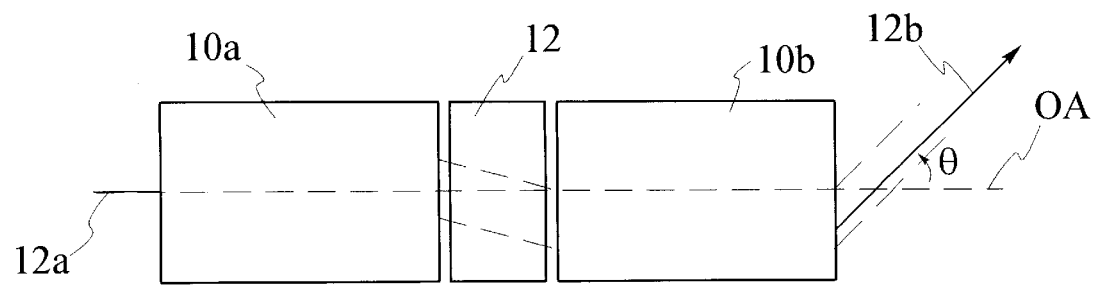

FIG. 4 illustrates an optical filter arrangement in accordance with an aspect of the invention wherein an input optical fibre 12*a* is disposed coaxially with and along the optical axis of a GRIN lens 12*a*. A thick filter element 12 is shown sandwiched between the first GRIN lens 12*a* and a second GRIN lens 12*b*. The filter element 12 is shown to shift the beam exiting the first GRIN lens 12*a*. Upon entering the second GRIN lens 10*b*, the beam propagates through the lens and exits at an angle θ. In order to more efficiently couple the optical energy from the beam, an optical fibre is disposed at a port on the outwardly facing end face of the lens 10*b* and at an angle θ with respect to the optical axis of the GRIN lens 10*b*. It should be noted, that as the substantially collimated beam entering the second GRIN lens becomes more offset from the OA of the lens, the angle at which the beam exits the output port of the lens 10*b* becomes steeper, and this the output fibre must be more angled with respect to the OA of the lens.

Figure 5:
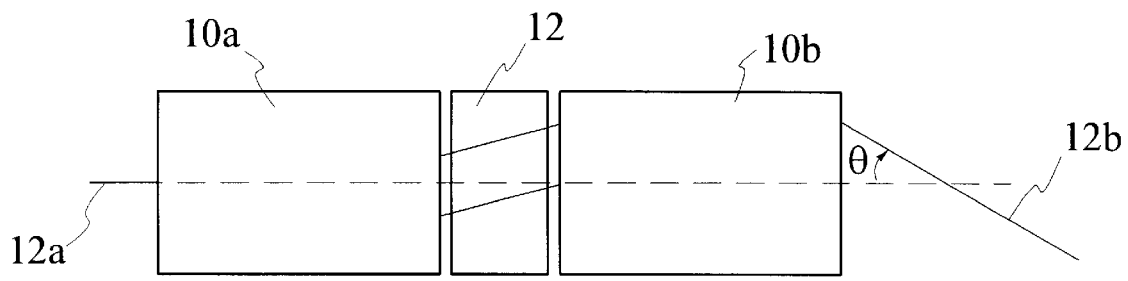
FIG. 5 is a block diagram of an optical filter arrangement wherein an upward shift of the beam traversing the gap between two GRIN lenses causes a downward shift in the output beam exiting the output end face of the GRIN lens.

FIG. 5 illustrates an optical filter arrangement wherein an upward shift of the beam traversing the gap between two GRIN lenses causes a downward shift in the output beam exiting the output end face of the GRIN lens 10*b*. Light is efficiently coupled into the output fibre 12*b* which is angled downward as is the beam which exits the end face of the lens.

Figure 6:
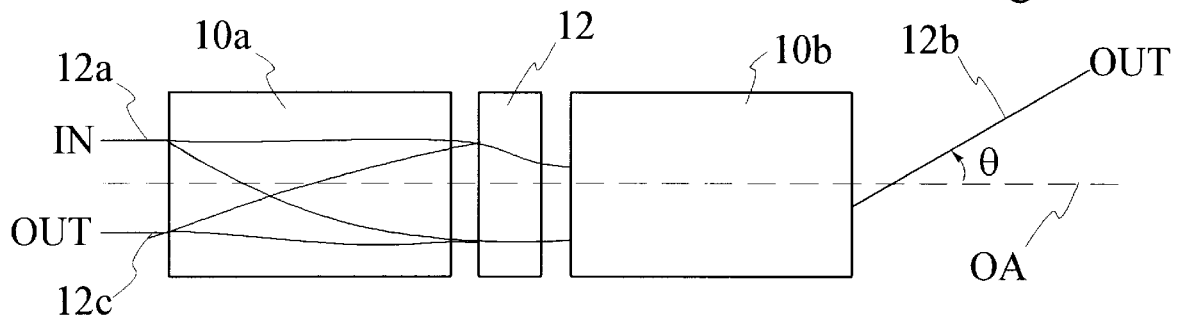
FIG. 6 is a block diagram of an embodiment of the invention wherein a three-port device is provided.

FIG. 6 shows an embodiment of the invention wherein a three-port device is provided. Light launched into the input port 12*a* is either passed through the filter 12 to be received by the fibre 12*b* or is reflected to the receiving fibre 12*c*. The output fibre 12*b* is angled by θ degrees so as to more efficiently capture the light incident thereon.

Figure 7:
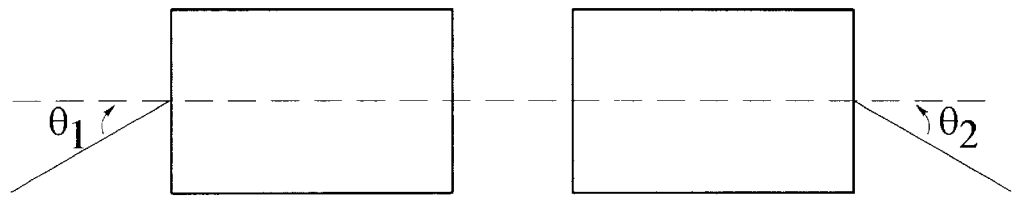
FIG. 7 is a block diagram of an embodiment of the invention wherein both the input and output optical fibres are angled by angles θ1 and θ2 respectively.
Figure 8:
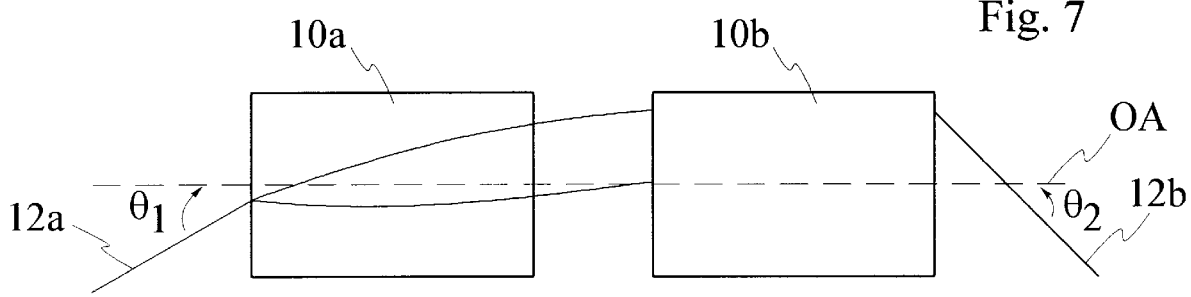
FIG. 8 is a block diagram of an embodiment of the invention wherein both the input and output optical fibres are angled by angles θ1 and θ2 respectively and, FIG. 9 is a block diagram of a similar embodiment to FIG. 7, wherein the input and output optical fibres are located off the optical axis of the lens.
Figure 9:
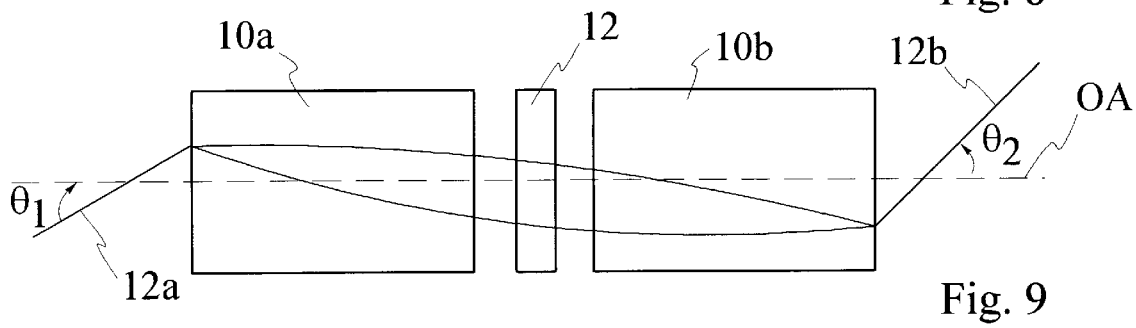

FIGS. 7, 8, and 9 illustrates embodiments of the invention wherein both the input and output fibres are angled by angles θ1 and θ2 respectively, wherein θ1 =θ2 and in another instance wherein θ1≠θ2.

A commonly used fibre tube or ferrules housing the fibre can be polished to achieve the required angles for efficiently coupling light.

Although the facet or end face of the lens is shown as being perpendicular to the optical axis of the lens in the drawings, this is not a requirement. In other embodiments not shown, the end face or facet may be angled, and the end facet or face of the optical fibre coupled thereto may have a complementary angled face to mate with the angled end facet of the lens.

Numerous other embodiments may be envisaged without departing from the spirit and scope of the invention. For example, in the aforementioned description, for ease of explanation the first lens has been denoted as the input lens, wherein the second lens has been denoted as the output lens. Of course the device is not restricted to use in this forward direction and can be used in an alternate manner wherein the second lens functions as the input end, and the first lens as the output end. The required angle on the fibre 12*b* would however be necessary to achieve enhanced coupling.

What is claimed is:

1. An optical coupling arrangement comprising:

a first substantially collimating lens, having an input port at an input end face, and a substantially collimating output end face;

a second substantially collimating lens, having a substantially collimating input end face and an output end face having an output port, wherein the output end face of the first substantially collimating lens is in-line and spaced from the input end face of the second substantially collimating lens;

a first longitudinal optical waveguide having a longitudinal optical axis optically coupled to the input port at the first end face; and, a second optical waveguide having a longitudinal optical axis optically coupled to the output port of the second substantially collimating lens, wherein the longitudinal optical axis of the second optical waveguide and the longitudinal optical axis of the first optical waveguide are not parallel.

2. An optical coupling arrangement as defined in claim 1, wherein the first substantially collimating lens includes at lest two ports at the input end face, one of the ports being an input port and the other of the ports being an output port.

3. An optical coupling arrangement as defined in claim 1, further comprising an optical element disposed between the first substantially collimating lens and the second substantially collimating lens.

4. An optical coupling arrangement as defined in claim 3, wherein the substantially collimating lenses are GRIN lenses and wherein the optical element is a multilayer optical filter contacting at least one of the output end face of the first GRIN lens and the input end face of the second GRIN lens.

5. An optical coupling arrangement as defined in claim 4, wherein the optical multilayer filter is coated on an end face of one of the GRIN lenses.

6. An optical coupling arrangement comprising:
   a first substantially collimating lens, having an input port at an input end face at a first end, and a output end face at another end;
   a second substantially collimating lens, having an input end face at a first end and an output end face at another end having an output port, wherein the output end face of the first substantially collimating lens is in-line and spaced from the input end face of the second substantially collimating lens;
   a first optical waveguide having a longitudinal optical axis, said waveguide being optically coupled to the input port at the input end face of the first substantially collimating lens; and,
   a second optical waveguide having a longitudinal optical axis, said second waveguide being optically coupled to the output port of the second substantially collimating lens, wherein a line extending the longitudinal optical axis of the second optical waveguide intersects a line extending the optical axis of the first optical waveguide at an angle other than zero degrees.

7. An optical coupling arrangement as defined in claim 6, wherein the first and second lenses are substantially quarter pitch GRIN lenses.

8. An optical coupling arrangement as defined in claim 7, wherein the optical axis of the first optical waveguide about the location wherein the first optical waveguide is optically coupled to the input port of the first GRIN lens is non parallel with the optical axis of the second optical waveguide about the location wherein the second optical waveguide is optically coupled to the output port.

9. An optical coupling arrangement as defined in claim 6, wherein the substantially collimating lenses are GRIN lenses, and wherein the optical axis of the first optical waveguide and the end face of the input port of the first GRIN lens are orthogonal, and wherein the wherein the optical axis of the second optical waveguide and the end face of the output port of the second GRIN lens are non-orthogonal.

10. An optical coupling arrangement as defined in claim 6, further comprising an optical element disposed between the first substantially collimating lens and the second substantially collimating lens.

11. An optical coupling arrangement as defined in claim 10, wherein the optical element is an optical filter.

12. An optical coupling arrangement as defined in claimed 11, wherein the input port at the input end face of the first GRIN lens is at a location offset from the optical axis of the first GRIN lens, and wherein the output port of the second GRIN lens is at a location offset from the optical axis of the second GRIN lens.

13. An optical coupling arrangement as defined in claim 10, wherein the substantially collimating lenses are GRIN lenses and wherein the optical element is a multilayer optical filter contacting at least one of the output end face of the first GRIN lens and the input end face of the second GRIN lens.

14. An optical coupling arrangement as defined in claim 13, wherein the optical multilayer filter is coated on an end face of one of the GRIN lenses.

* * * * *